United States Patent
Singh et al.

(10) Patent No.: US 11,810,044 B1
(45) Date of Patent: Nov. 7, 2023

(54) SYSTEM AND METHOD OF PROVIDING A SUPPLY CHAIN DIGITAL HUB

(71) Applicant: JDA Software Group, Inc., Scottsdale, AZ (US)

(72) Inventors: Ripu Daman Singh, Southlake, TX (US); Madhav S. Durbha, Suwanee, GA (US); John Sarvari, Suwanee, GA (US); Anand Medepalli, Richmond (GB)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 15/484,999

(22) Filed: Apr. 11, 2017

Related U.S. Application Data (60) Provisional application No. 62/321,123, filed on Apr. 11, 2016.

(51) Int. Cl.
*G06Q 10/08* (2023.01)
*H04L 67/025* (2022.01)
(Continued)

(52) U.S. Cl.
CPC ....... *G06Q 10/08* (2013.01); *G05B 19/41835* (2013.01); *G06N 20/00* (2019.01); *H04L 67/025* (2013.01)

(58) Field of Classification Search
CPC .. G06Q 10/08; G06N 20/00; G05B 19/41835; H04L 67/025
See application file for complete search history.

(56) References Cited

U.S. PATENT DOCUMENTS

| | | | |
|---|---|---|---|
| 7,142,110 B2* | 11/2006 | Schmidtberg | G06Q 10/06 340/539.27 |
| 7,225,140 B2* | 5/2007 | Yanagino | G06Q 10/06 705/7.31 |

(Continued)

OTHER PUBLICATIONS

Yin, T., Cao, Q., & Xu, Y. (2009). The necessity and utility analysis of enterprise alliance in E-commerce market. Journal of Information and Computational Science, 6(1), 517-524. Retrieved from https://dialog.proquest.com/professional/docview/779557156?accountid=142257 (Year: 2009).*

*Primary Examiner* — Michael Jared Walker
(74) *Attorney, Agent, or Firm* — Spencer Fane LLP; Steven J. Laureanti (57) ABSTRACT

A system and method are disclosed including a digital hub and a cloud database. The digital hub encodes, as a virtual supply chain network, the structure, one or more objectives, and one or more states of a supply chain network and contextualizes data received from one or more supply chain entities and one or more external data sources with the virtual supply chain network. The digital hub further employs machine learning to extract insights from the contextualized data and monitors external data sources for an event that may impact the one or more objectives of the supply chain network. Responsive to identifying an event that may impact the one or more objectives, the digital hub automatically adjusts one or more of robotic warehouse systems, robotic inventory systems, automated guided vehicles, mobile racking units, automated robotic production machinery, and robotic devices.

17 Claims, 2 Drawing Sheets

(51) Int. Cl.
   *G05B 19/418*  (2006.01)
   *G06N 20/00*   (2019.01)

(56) References Cited

U.S. PATENT DOCUMENTS

| | | | | |
|---|---|---|---|---|
| 7,552,066 B1* | 6/2009 | Landvater | G06Q 10/06315 | 705/7.25 |
| 7,720,905 B1* | 5/2010 | O'Connell, Jr. | G06Q 10/06 | 709/202 |
| 7,840,449 B2* | 11/2010 | Ebel | G06Q 10/087 | 705/28 |
| 7,908,187 B2* | 3/2011 | Reddy | G06Q 10/087 | 705/28 |
| 8,560,478 B1* | 10/2013 | DeSpain | G06Q 10/06 | 706/46 |
| 2004/0064351 A1* | 4/2004 | Mikurak | G06Q 10/087 | 705/22 |
| 2004/0210473 A1* | 10/2004 | Goddard | G06Q 10/06315 | 705/7.25 |
| 2005/0044197 A1* | 2/2005 | Lai | G06Q 10/10 | 709/223 |
| 2005/0055308 A1* | 3/2005 | Meyer | G06Q 40/00 | 705/38 |
| 2005/0182722 A1* | 8/2005 | Meyer | G06Q 10/06 | 705/40 |
| 2007/0073553 A1* | 3/2007 | Flinn | G06Q 30/0283 | 705/1.1 |
| 2007/0226082 A1* | 9/2007 | Leal | G06Q 30/02 | 705/14.71 |
| 2007/0239858 A1* | 10/2007 | Banerji | G06Q 30/06 | 709/220 |
| 2008/0162305 A1* | 7/2008 | Rousso | G06Q 20/40 | 705/26.5 |
| 2008/0169343 A1* | 7/2008 | Skaaksrud | G06Q 10/08 | 235/376 |
| 2009/0210081 A1* | 8/2009 | Sustaeta | G05B 13/0285 | 700/99 |
| 2009/0254971 A1* | 10/2009 | Herz | G06Q 30/0603 | 726/1 |
| 2010/0235307 A1* | 9/2010 | Sweeney | G06N 5/02 | 706/12 |
| 2011/0215948 A1* | 9/2011 | Borgerson | G06Q 10/0831 | 340/989 |
| 2012/0030160 A1* | 2/2012 | Ratnam | G06Q 10/00 | 706/47 |
| 2012/0095833 A1* | 4/2012 | Bleyl | G06Q 30/02 | 705/14.53 |
| 2013/0144701 A1* | 6/2013 | Kulasooriya | G06Q 20/202 | 705/14.24 |
| 2013/0241952 A1* | 9/2013 | Richman | G06F 17/21 | 345/619 |
| 2013/0262349 A1* | 10/2013 | Bouqata | G06N 20/00 | 706/12 |
| 2014/0024999 A1* | 1/2014 | Levien | G16H 40/67 | 604/66 |
| 2014/0025767 A1* | 1/2014 | De Kezel | G06Q 10/107 | 709/206 |
| 2014/0123178 A1* | 5/2014 | Burkitt | H04N 21/23424 | 725/34 |
| 2014/0361077 A1* | 12/2014 | Davidson | G06Q 10/08 | 235/385 |
| 2015/0026112 A1* | 1/2015 | Alboszta | G06N 7/005 | 706/46 |
| 2015/0073929 A1* | 3/2015 | Psota | G06Q 50/28 | 705/26.2 |
| 2016/0042147 A1* | 2/2016 | Maurer | G06F 19/3456 | 705/3 |
| 2016/0162478 A1* | 6/2016 | Blassin | G06Q 10/06311 | 706/12 |
| 2016/0170974 A1* | 6/2016 | Martinez Corria | G06F 40/58 | 704/4 |
| 2016/0196527 A1* | 7/2016 | Bose | G06Q 10/067 | 705/332 |
| 2017/0006135 A1* | 1/2017 | Siebel | H04L 67/2833 | |
| 2018/0053114 A1* | 2/2018 | Adjaoute | G06N 3/126 | |

* cited by examiner

SYSTEM AND METHOD OF PROVIDING A SUPPLY CHAIN DIGITAL HUB

CROSS-REFERENCE TO RELATED APPLICATIONS

The present disclosure is related to that disclosed in the U.S. Provisional Application No. 62/321,123, filed Apr. 11, 2016, entitled "Supply Chain Digital Hub of Hubs." U.S. Provisional Application No. 62/321,123 is assigned to the assignee of the present application. The subject matter disclosed in U.S. Provisional Application No. 62/321,123 is hereby incorporated by reference into the present disclosure as if fully set forth herein. The present invention hereby claims priority under 35 U.S.C. § 119(e) to U.S. Provisional Application No. 62/321,123.

TECHNICAL FIELD

The present disclosure relates generally to a virtual supply chain network and specifically to a system and method of providing a supply chain digital hub.

BACKGROUND

Enterprises comprising one or more supply chain entities have a diverse portfolio of supply chain planning and execution applications that help generate plans, execute the plans, and analyze the business of the enterprise. These applications, and the data on which they operate, are often siloed from each other and isolated behind firewalls and thus, locked into separate domains. These applications therefore have a fragmented representation of the business, separate from the current events affecting them. The representations and assumptions made in one application may not conform to the representations and assumptions in another application, and the gap is only bridged, if at all, by planners.

As these planners collaborate with each other to generate and execute the plans, these deficiencies are revealed by the inconsistent set of representations and assumptions of the application and data that lead to underperforming decisions, at best, and incorrect decisions, at worst. The problem is exacerbated when this collaboration is with a supply chain entity who is both a collaborator and a competitor. Lack of business objectives, represented clearly and consistently between supply chain partners may lead to broken supply chain partnerships and a loss of considerable value in a supply chain network.

Despite decades of supply chain management and operations improvement, current techniques fail to provide end-to-end comprehension of supply chain networks and the events that potentially impact the supply chain. Supply chain planners and other users have limited visibility to useful information and no one individual planner or entity has a full picture of competing business goals at different levels of dimensionality. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to a digital hub that represents a virtual supply chain network. Combining the onboarding of inter- and intra-enterprise data sources with external data sources, the digital hub may resolve supply chain problems and provide slices of data and insights in a context-aware manner. As described in more detail below, aspects of the digital hub may incorporate machine learning to derive insights from the combination of external data sources and inter- and intra-enterprise data, support autonomous intelligent software agents to negotiate and work with each other to deliver plans, execute decisions in a business goal- and objective-aware manner, and enable business models that provide capacity and inventory sharing and subscription sales of industry metrics. According to a further aspect, the digital hub supports natural language processing for business users to input a natural language or other search query to resolve supply chain problems. Other functions and aspects of the digital hub and the supply chain system are described in more detail below.

Figure 1:
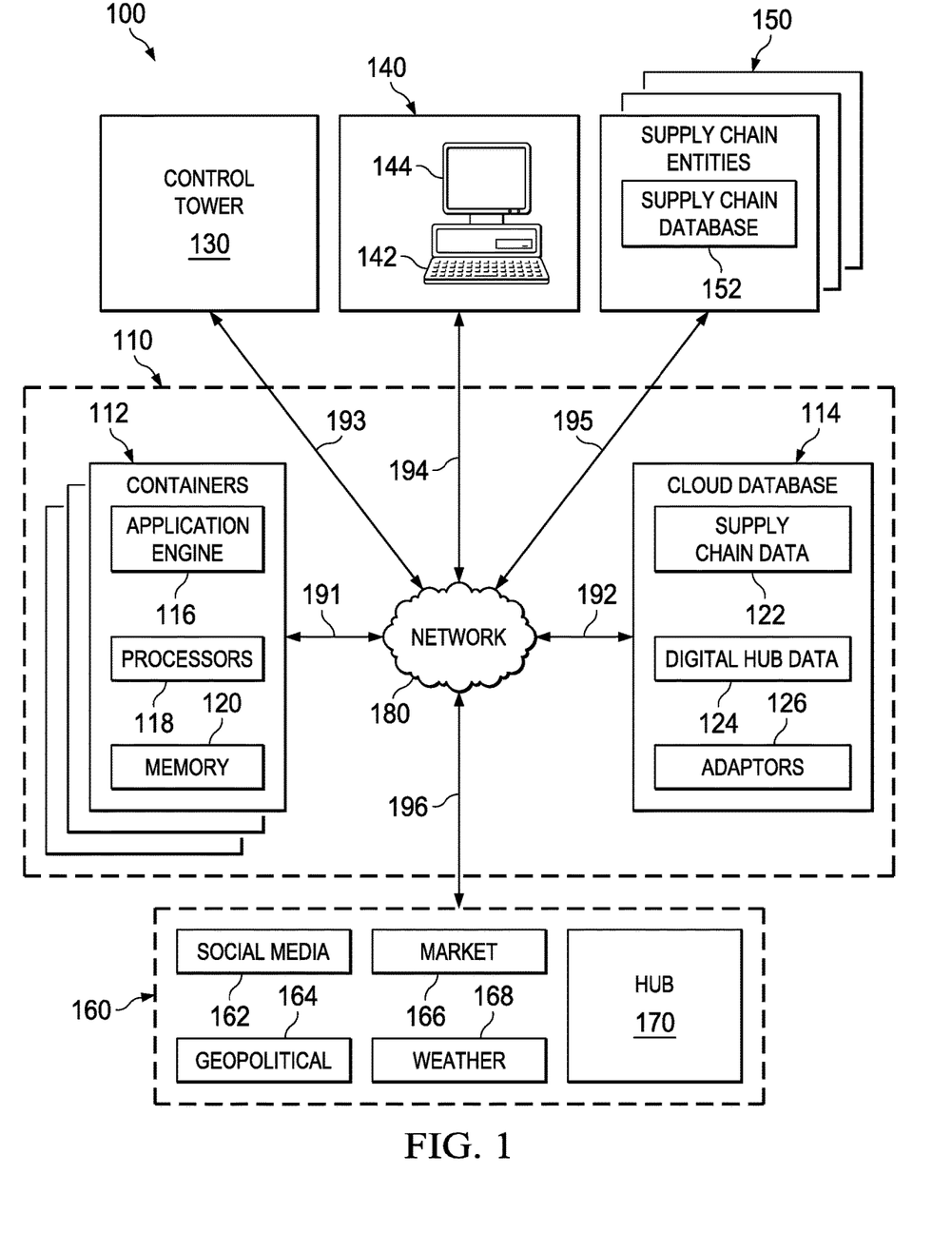
FIG. 1 illustrates an exemplary system, according to an embodiment.

FIG. 1 illustrates an exemplary system 100 according to an embodiment. System 100 comprises digital hub 110, one or more containers 112, cloud database 114, control tower 130, computer 140, one or more supply chain entities 150, external data sources 160, network 180, and communication links 191-196. Although a single digital hub 110, one or more containers 112, a single cloud database 114, a single control tower 130, a single computer 140, one or more supply chain entities 150, a group of external data sources 160, and a single network 180 are shown and described; embodiments contemplate any number of digital hubs 110, containers 112, cloud databases 114, control towers 130, computers 140, supply chain entities 150, external data sources 160, and networks 180, according to particular needs.

As will be discussed below in more detail, one or more supply chain entities 150 represent one or more multi-enterprise supply chain entities and/or supply chain networks including supply chain networks of one or more enterprises. The supply chain entities comprise, for example, one or more suppliers, manufacturers, distribution centers, retailers, stores, online stores, and/or customers. In accordance with the principles of embodiments described herein, digital hub 110 receives, stores, transmits, and/or utilizes a digital representation of these one or more supply chain networks (i.e. a virtual supply chain network) which encodes the physical, logical, and business structure of the supply chain network, the goals, plans, assumptions, objectives, and state (including transactional state) of the supply chain network at any past, current, and future periods, external data sources 160 including, for example, social media 162, geopolitical 164, market 166, weather 168, and the like, including big data objects. According to embodiments, digital hub 110 comprises one or more containers 112 and cloud database 114. In addition, or as an alternative, digital hub 110 comprises a cloud-based system and Platform as a Service (PaaS).

According to these embodiments, digital hub 110 eschews traditional architecture, such as a physical or virtual server, and instead comprises one or more containers 112 using appropriate coding languages to deliver services without requiring an end user to configure or monitor the physical infrastructure. Among other things, using PaaS to deliver large scale solutions minimizes the number of operations activity that would need to be built around a solution. Furthermore, one or more supply chain entities 150 are not responsible for ensuring uptime, the level of performance, performing backups or disaster recovery. Rather, these services may be handled by extensive degrees of automation, such as, for example, in a dark data center.

One or more containers 112 comprise application engine 116, one or more processors 118, and memory 120. Applications for supply chain management and operation are stored in one or more containers 112 in the cloud and run on application engine 116 of one or more containers 112. Such applications may include, but are not limited to, allocation, assortment planning, category management, demand planning, factory planning and sequencing, floor planning, flowcasting, fulfillment, inventory management, order promising, planogram generation, pricing and revenue management, retail pricing, sales and operations planning, space planning, store operations, task management, transportation management, warehouse labor management, warehouse management, workforce management and the like.

In one embodiment, the amount of processing power of processors 118 and memory 120 associated with each container 112 is handled automatically by services in the cloud. For example, each container 112 may be associated with one, ten, one hundred, or any number of processors 118, according to particular needs. In addition, or as an alternative, each container 112 may be associated with ten megabytes, ten gigabytes, or any amount of memory 120, according to particular needs.

Cloud database 114 comprises one or more databases or other data storage arrangements at one or more locations, local to, or remote from, digital hub 110, containers 112, control tower 130, one or more computers 140, and one or more supply chain entities 150. Cloud database 114 comprises supply chain data 122, digital hub data 124, and adaptors 126. Supply chain data 122 may comprise, for example, multi-enterprise supply chain data, including, for example, metadata (comprising dimensions, hierarchies, levels, members, attributes, and member attribute values), fact data (comprising measure values for combinations of members), and various decision variables, business constraints, goals and objectives of one or more supply chain entities 150.

Digital hub data 124 comprises data that supports applications, the virtual supply chain network, supply chain entities of one or more enterprises, tenant and platform features, content and connections, APIs, and other objects that enable the features and operation of digital hub 110, as discussed in more detail in connection with FIG. 2. As explained in more detail below, digital hub data 124 provides APIs that allow one or more supply chain entities 150 to upload or share data to the cloud. Although cloud database 114 is illustrated as a single database comprising two data stores, embodiments contemplate data on cloud database 114 to be stored in a scalable and distributed architecture at one or more locations remote or local to cloud database 114, such as, for example, at one or more remote data centers. Although data may be spread and duplicated across many physical locations, embodiments of the digital hub 110 may present the data to appear as a single copy located in a single location.

Adaptors 126 comprise an interface between one or more applications and digital hub 110. Adaptors 126 may be located in cloud database 114 and interface with applications directly from cloud database 114. In addition, or as an alternative, adaptors 126 may be located at a supply chain entity database 152. Storing adaptors 126 at supply chain entity database 152 provides many benefits to applications that function poorly with a direct connection from the cloud In addition, storing adaptors 126 at supply chain entity database 152 increases security for the supply chain entity environment by limiting communication links 191-196 to a single communication link 195 between the one or more supply chain entities 150 and digital hub 110, rather than multiple connections. According to embodiments, some adaptors 126 may be developed natively, while others may be open-sourced and exchanged among a community of other digital hub 110 users.

According to embodiments, adaptors 126 interface with both data and action capabilities of digital hub 110. For data, adaptors 126 provide an interface between data of one or more supply chain entities 150 and the digital hub 110 to simplify on-boarding of different applications, such as, for example, supply chain management and operations planning. For example, adaptors 126 may map data into a structure that is required for the APIs.

According to other embodiments, adaptors 126 support action capabilities of digital hub 110. For example, when digital hub 110 identifies an opportunity or an exception to a supply chain plan, digital hub 110 generates possible actions that a user may select to resolve the exception. In response to a user selection of an action, such as by clicking a button on a user interface associated with the digital hub 110, digital hub 110 automatically interfaces with the underlying supply chain management and operations applications to initiate the changes based upon the option the user has chosen. This may comprise, for example, adjusting the orders and/or inventory of the one or more supply chain entities 150 based on the chosen action.

For example, digital hub 110 may use machine learning to analyze enterprise data (intra- and inter-enterprise data) combined with data from external data sources 160 to, for example, correlate patterns in data sources with supply chain events to improve the correction of negative impacts of supply chain events, take advantage of positive impacts of supply chain events, better predict the results of corrective actions, identify inflection points (such as when forecast is misaligned with actual data), provide an overview of industry trends to subscription customers while anonymizing data, identifying data items that appears in different data sources under different names (mapping), and defining common data standards based on big data.

In one embodiment, digital hub 110 incorporates various supply chain constraints from one or more supply chain entities 150, transactional data related to orders, inventory, in-transits, shelves, distribution centers, factories, and the like, and represents the current and past state of plans (including, for example, distribution plans, demand plans, master plans, assortment plans, allocation plans, factory plans, or like plans). Digital hub 110 digests supply chain events data, traffic, and the like and uses it to affect the plans and execution. All this is made visible to, and ready for consumption by, software agents and planners.

According to embodiments, digital hub 110 may also support future business models featuring inventory and capacity sharing by trading partners, and making industry-wide and cross-industry-wide supply chain metrics available on a subscription basis. According to aspects, such visibility to benchmarks may be coupled with applications that help companies improve their supply chain performance. In addition, digital hub 110 includes PaaS by providing all common denominator services used by current and future supply chain management and operations applications. These services include but are not limited to security framework, master data management, cross application workflow authoring, and UX (user experience) frameworks, all as explained in more detail below.

In order to explain the operation of digital hub 110, several examples are now given. In the first example, a supply chain entity 150, such as, a steel mill is experiencing a production problem. This event may be detected in the change to the capacity picture or a supply chain event is received from a third party syndicated source. The virtual supply chain network of digital hub 110 communicates to the participating partners (other supply chain entities 150, enterprises, etc) about the issue, such as, how long it will last, what plans get affected by it, what is the volume, margin, revenue impact of it to downstream supply chain entities 150 and so on. Continuing with this example, if one of the participating partners is an engine manufacturer and relies on the steel affected by the steel mill issue, engine manufacturer's plans, and its effect on its customers (i.e., automotive), is evaluated. Digital hub 110 provides various alternatives, for example, offloading supply to other qualified steel mills, evaluates the impact of this on margin, etc.

This ripple effect from the steel mill to the engine (and other industrial) manufacturers to the automotive customers is propagated with the supply chain constraints and business objectives, and the participating partners are made aware of the effect on the supply chain operational and business plans, and the possible alternatives to it. Although, a particular example is described in the steel mill industry; embodiments contemplate various production problems or supply chain network problems in other industries. For example, a production problem may occur in a glass manufacturer making screens, affecting devices and ultimately retailers, other participating partners may also be affected. As discussed below, although there are hubs today which collect specific information, for example, weather information, the collection of data is static and does not relate to supply chain network operations nor bring the collection of data into the context of supply chain planning. Embodiments of the disclosure provide for what has happened, what is happening, and what will happen, to be in context of what was planned to happen, and what needs to happen in the future. Digital hub 110 provides the critical linkage between the past and future plans and analyzes events within context, which, according to embodiments, enables a business-oriented view of the overall supply chain network.

According to embodiments, digital hub 110 addresses the lack of a holistic view of supply chain management by providing an open architecture to connect to external data sources 160, such as, social media sources 162, (including, for example, FACEBOOK, TWITTER, LINKEDIN, and other like social platforms), geopolitical sources 164, market sources 166, weather sources 168, and external digital hubs 170.

With the advent of cheaper cloud storage, "Internet of Things," and "Big Data," there has been an emergence of 'hubs' focused on specific information, such as, for example, social media, news events, market events, political events, traffic, weather, competitive promotions, and the like. These hubs collect information on what they are focused on, and make it available to subscribers, such as one or more supply chain entities 150 or other users of system 100. Subscribers may put in textual filters and tags to receive data relevant to them. According to an embodiment, digital hub 110 utilizes this data, and the relevancy thereof, to supply chain planning and execution (both short-term and long-term plans) of the supply chain entities 150. As an example only, and not by way of limitation, a fire in a semiconductor foundry will lead to shortage of semiconductor chips for consumer electronics. An event alerting the subscriber to this will lead to quick action to, for example, book another foundry to manufacture the semiconductor chip. The supply chain entity 150 who responds to this event, the fastest, gets the most value and savings. As another non-limiting example and on the other end of the spectrum, a traffic accident on a delivery route can alert a supply chain entity 150, such as, a store, about the delay in replenishing stocked out items, and the store can run a spot promotion on a similar (substitute) item to capture potentially lost sales.

According to embodiments, digital hub 110 receives and stores enterprise data (which, may be inter-enterprise data or intra-enterprise data) from one or more supply chain entities 150 and external data from one or more external data sources 160. According to embodiments, by combining and aggregating the enterprise data sources with the external data sources 160, digital hub 110 resolves supply chain problems and provides slices of data and insights in a context-aware manner, such as, for example, the end-to-end supply chain context of the virtual supply chain network. The virtual supply chain network is enriched and made more relevant by the received enterprise data, which provides the context and ability for initiating instant collaboration within and outside of a supply chain entity 150. That is, virtual supply chain network provides the fundamental backbone for interaction of supply chain management and operations applications. In addition, digital hub 110 supports a multi-enterprise system by capturing intra-enterprise and inter-enterprise relationships and networks in physical detail, including, for example, coordinates, storage capacity, docking bays, transportation capacities, resource capacities, throughputs, and the like, to multiple planning abstractions. In addition, or as an alternative, digital hub 110 consolidates data from the external data sources 160, such as big data feeds into the context of supply chain planning and execution. According to embodiments, this consolidation does not comprise merely a textual filter and aggregator, but rather, digital hub 110 may inherently understand the context surrounding the data based, at least in part, on the virtual supply chain network.

Control tower 130 comprises a user interface that aggregates information consolidated by digital hub 110 and creates and displays graphs, charts, and other visualizations of the aggregated information to one or more users (such as managers, planners, executives, and the like), and displays the effects from external data sources 160 on supply chain goals, plans, and targets. The user interface of control tower 130 comprises actionable selections, such as prescriptive options which, when activated, make changes to underlying supply chain management toolsets (including, for example, workforce management solutions, transportation management solutions, warehouse management solutions, and the like) to resolve supply chain problems. To further explain the control tower 130, an example is now given.

In the following example, and as explained in more detail below, digital hub 110 consolidates information from external data sources 160, such as weather data 166, which is aligned with transactions from one or more supply chain entities 150. In this example, digital hub 110 aligns the product's past, current, and future locations, its mode of transportation, alternate sourcing options, and historical data with various geographical weather patterns to generate expected results of the weather pattern and actionable selections to resolve any disruptions to supply chain plans. Therefore, control tower 130 may generate an alert or provide other visualization that indicates that inclement weather is moving into a particular area and/or the likely results and solutions to any disruptions that will likely be created. For example, control tower 130 may indicate that a particular warehouse of one or more supply chain entities 150 closes for eight hours when a snowstorm of a particular intensity hits the region in which it is located.

Because the warehouse is closed, its resulting inability to send or receive shipments ripples through the supply chain, and control tower 130 indicates the predicted effects on customer service levels, labor, shipping times, and the like. Control tower 130 may then generate prescriptive options to resolve the disruption, such as, for example, shifting the warehouse to be open for 24-hour periods until any backlog of shipments is resolved. This may include opening additional shifts for labor, arranging extra transportation to the facility, and scheduling the transportation for periods when the warehouse would normally be closed. Instead of needing to navigate directly to a workforce management solution, transportation management solution, and a warehouse management solution, control tower 130 interfaces directly with supply chain management toolsets and/or one or more supply chain entities 150 to directly resolve the supply chain disruption.

As shown in FIG. 1, system 100 operates on one or more computers 140 that are integral to or separate from the hardware and/or software that support digital hub 110, control tower 130, one or more supply chain entities 150, and external data sources 160. In addition, and as discussed herein, digital hub 110 may comprise a cloud based computing system having processing and storage devices at one or more locations, local to, or remote from digital hub 110. Computers 140 may include any suitable input device 142, such as a keypad, mouse, touch screen, microphone, or other device to input information. An output device 144 may convey information associated with the operation of system 100, including digital or analog data, visual information, or audio information. Computers 140 may include fixed or removable computer-readable storage media, including a non-transitory computer-readable medium, magnetic computer disks, flash drives, CD-ROM, in-memory device or other suitable media to receive output from and provide input to system 100. Computers 140 may include one or more processors 144 and associated memory to execute instructions and manipulate information according to the operation of system 100.

In addition, each of the one or more computers 140 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with digital hub 110. These one or more users may include, for example, "intelligent software agents," a "manager," or a "planner" handling manufacturing or retail planning, systems management, enterprise planning, and/or one or more related tasks within system 100. In addition, or as an alternative, these one or more users within system 100 may include, for example, one or more computers 140 programmed to autonomously handle, among other things, manufacturing equipment, adjusting inventory levels at various stocking points and distribution centers, adjusting resource allotment or distribution at a utility system, and/or one or more related tasks within system 100.

As discussed above, one or more supply chain entities 150 represent one or more supply chain networks including one or more enterprises, such as, for example suppliers, manufacturers, distribution centers, retailers, stores, online stores, and/or customers. Supply chain database 152 may comprise any data of the one or more supply chain entities 150 or data of one or more enterprises including, for example, metadata (comprising dimensions, hierarchies, levels, members, attributes, and member attribute values), fact data (comprising measure values for combinations of members), and various decision variables, business constraints, goals and objectives of one or more supply chain entities 150.

A supplier may be any suitable entity that offers to sell or otherwise provides one or more items (i.e., materials, components, or products) to one or more manufacturers. Such suppliers may comprise automated distribution systems that automatically transport products to one or more manufacturers based, at least in part, on a plan determined by the one or more planners. In addition, or as an alternative, each of the one or more items may be represented by an identifier, including, for example, Stock-Keeping Unit (SKU) or Universal Product Code (UPC) information.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity in system 100, such as a retailer, an item that needs further processing, or any other item. A manufacturer may, for example, produce and sell a product to a supplier, another manufacturer, a distribution center, retailer, a customer, or any other suitable person or entity. Such manufacturers may comprise automated robotic production machinery that produce products based, at least in part, on a plan determined by the one or more planners.

A distribution center may be any suitable entity that offers to store or otherwise distributes at least one product to one or more retailers and/or customers. A distribution center may, for example, receive a product from another entity in the supply chain network and store and transport the product for another supply chain entity. Such distribution centers may comprise automated warehousing systems that automatically remove products from and place products into inventory based, at least in part, on a plan determined by one or more planners.

A retailer may be any suitable entity that obtains one or more products to sell to one or more customers. Although one or more supply chain entities 150 is shown and described as separate and distinct entities, the same entity may simultaneously act as any one of the one or more supply chain entities 150. For example, one or more supply chain entities 150 acting as a manufacturer can produce a product, and the same entity can act as a supplier to supply an item to itself or another supply chain entity 150. Although one example of a supply chain network is shown and described, embodiments contemplate any operational environment and/or supply chain network, without departing from the scope described herein.

In one embodiment, one or more containers 112 may be coupled with network 180 using communications link 191, which may be any wireline, wireless, or other link suitable to support data communications between one or more containers 112 and network 180 during operation of system 100. Cloud database 114 may be coupled with network 180 using communications link 192, which may be any wireline, wireless, or other link suitable to support data communications between cloud database 114 and network 180 during operation of system 100. One or more control towers 130 are coupled with network 180 using communications link 193, which may be any wireline, wireless, or other link suitable to support data communications between one or more control towers 130 and network 180 during operation of distributed system 100. Computer 140 may be coupled with network 180 using communications link 194, which may be any wireline, wireless, or other link suitable to support data communications between computer 140 and network 180 during operation of system 100. One or more supply chain entities 150 may be coupled with network 180 using communications link 195, which may be any wireline, wireless, or other link suitable to support data communications between one or more supply chain entities 150 and network 180 during operation of system 100. External data sources 160 may be coupled with network 180 using communications link 196, which may be any wireline, wireless, or other link suitable to support data communications between external data sources 160 and network 180 during operation of system 100.

Although communication links 191, 192, 193, 194, 195, and 196 are shown as generally coupling one or more containers 112, cloud database 114, control tower 130, computer 140, one or more supply chain entities 150, and external data sources 160 to network 180; each of one or more containers 112, cloud database 114, control tower 130, computer 140, one or more supply chain entities 150, and external data sources 160 may communicate directly with each other, or through one or more adaptors 126, according to particular needs.

In another embodiment, network 180 includes the Internet and any appropriate local area networks (LANs), metropolitan area networks (MANs), or wide area networks (WANs) coupling one or more containers 112, cloud database 114, control tower 130, computer 140, one or more supply chain entities 150, and external data sources 160. For example, data may be maintained by locally or externally of one or more containers 112, cloud database 114, control tower 130, computer 140, one or more supply chain entities 150, and external data sources 160 and made available to one or more associated users of one or more supply chain entities 150 using network 180 or in any other appropriate manner. For example, data may be maintained in the cloud by digital hub 110 at one or more locations external to one or more supply chain entities 150 and made available to one or more associated users of one or more supply chain entities 150 using the cloud or in any other appropriate manner. Those skilled in the art will recognize that the complete structure and operation of communication network 180 and other components within system 100 are not depicted or described. Embodiments may be employed in conjunction with known communications networks and other components.

In accordance with the principles of embodiments described herein, digital hub 110 may generate a plan for the inventory of one or more supply chain entities 150 in the supply chain network. Furthermore, digital hub 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of products based on one or more generated plans and/or current inventory or production levels. For example, the methods described herein may include computers receiving product data from automated machinery having at least one sensor and the product data corresponding to an item detected by the automated machinery. The received product data may include an image of the item, an identifier, as described above, and/or other product data associated with the item (dimensions, texture, estimated weight, and any other like data). The method may further include computers looking up the received product data in a database system associated with digital hub 110 to identify the item corresponding to the product data received from the automated machinery.

The computers may also receive, from the automated machinery, a current location of the identified item. Based on the identification of the item, computers may also identify (or alternatively generate) a first mapping in the database system, where the first mapping is associated with the current location of the item. Computers may also identify a second mapping in the database system, where the second mapping is associated with a past location of the identified item. Computers may also compare the first mapping and the second mapping to determine if the current location of the identified item in the first mapping is different than the past location of the identified item in the second mapping. Computers may then send instructions to the automated machinery based, as least in part, on one or more differences between the first mapping and the second mapping such as, for example, to locate item to add to or remove from an inventory of or shipment for one or more supply chain entities 150. In addition, or as an alternative, digital hub 110 monitors the supply chain constraints of one or more items at one or more supply chain entities 150 and adjusts the orders and/or inventory of the one or more supply chain entities 150 based on the supply chain constraints.

Figure 2:
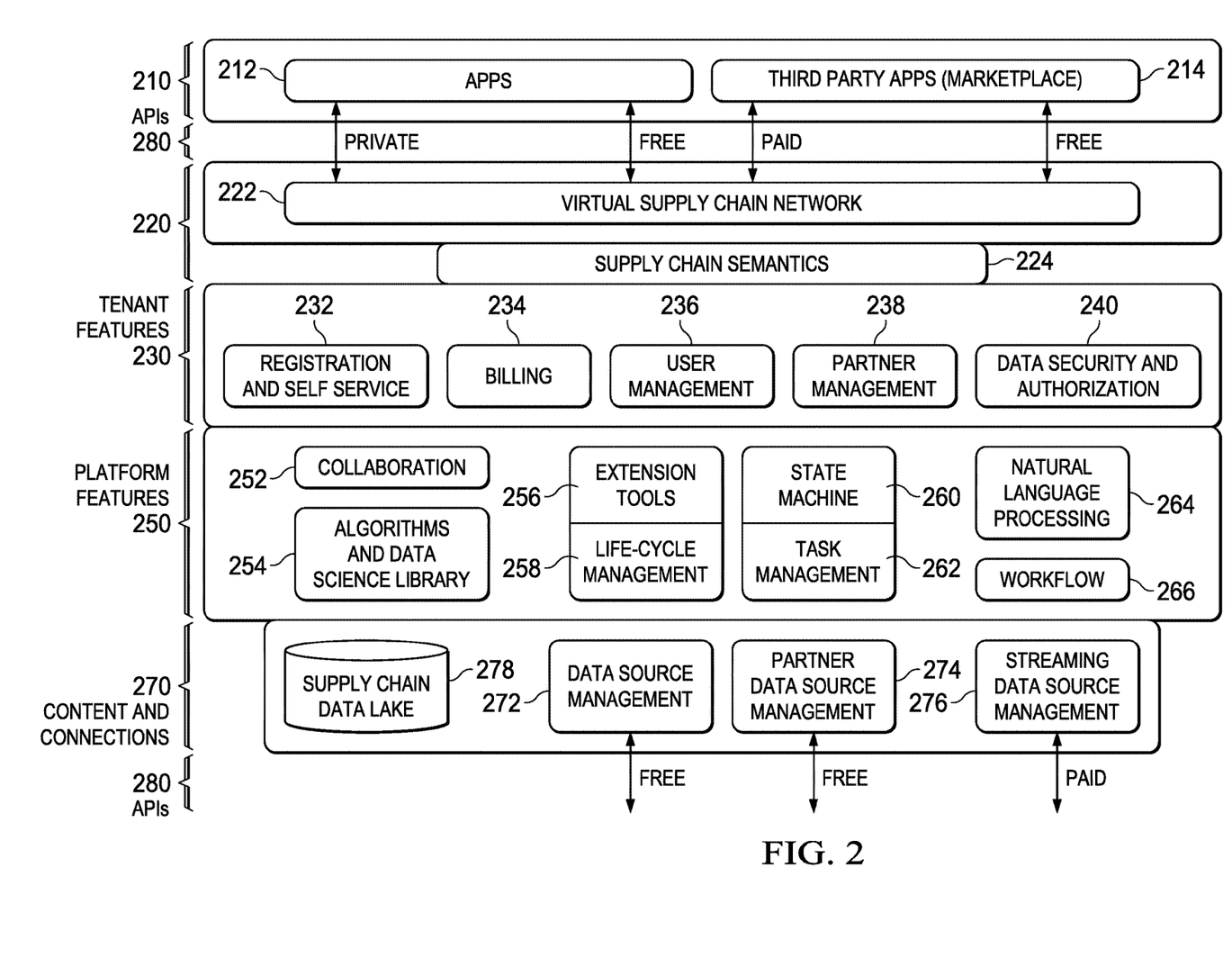
FIG. 2 illustrates an exemplary logical diagram of the digital hub of FIG. 1, according to an embodiment.

FIG. 2 illustrates an exemplary logical diagram of digital hub 110, according to an embodiment. Digital hub 110 may comprise an applications layer 210, virtual supply chain network layer 220, tenant features layer 230, platform features layer 250, content and connections layer 270, and APIs 280. Although digital hub 110 is illustrated as comprising a single applications layer 210, a single virtual supply chain network layer 220, a single tenant features layer 230, a single platform features layer 250, a single content and connections layer 270, and more than one API 280, embodiments contemplate any suitable number and combination of layers and APIs, according to particular needs. In addition, although the layers and APIs are illustrated as internal to digital hub 110, the one or more layers, APIs, and their constituents, or portions thereof, may be located internal or external to digital hub 110 at one or more locations local to or remote from digital hub 110, one or more containers 112, cloud database 114, control tower 130, computer 140, one or more supply chain entities 150, external data sources 160, and/or external data hub 170.

Applications layer 210 comprises native applications 212 and third party applications 214 that are executed on one or more containers 112 of digital hub 110, as explained above. Native applications 212 comprise applications built to provide value to the users of digital hub 110. Native applications 212 may include, for example, both business and technical applications. According to some embodiments, native applications 212 comprise intelligent autonomous agents acting on behalf of virtual supply chain networks and one or more users. According to some embodiments, autonomous agents make decisions on behalf of entities that they represent. These decisions may include, for example, publishing information, gathering information, conducting auctions, executing forecasting algorithms, executing planning algorithms, negotiating with partners, and the like.

Third party applications 214 comprise non-native applications, such as those built by one or more supply chain entities 150 or users based on particularized needs or just imply not already included in the native applications 212. Third party applications may be bought and sold on an applications marketplace to provide value to the users of digital hub 110.

Virtual supply chain network layer 220 comprises virtual supply chain network 222 and supply chain semantics 224. According to embodiments, virtual supply chain network 222 encodes the physical, logical, and business structure of one or more supply chain networks, the goals, plans, assumptions, objectives, and state (including transactional state) of the supply chain network at any past, current, and future periods, external data sources including, for example, social media, geopolitical, market, weather, and the like, and big data objects. In other words, virtual supply chain network layer 220 provides access to virtual supply chain network 222 for applications 212-214 in applications layer 210. One or more supply chain entities 150, parameters, strategies, supply chain data 122, and the like are accessible through virtual supply chain network layer 220. According to embodiments, virtual supply chain network layer 220 represents the supply chain business objectives at multiple levels and feeds from the rich platform infrastructure and the content from the lower levels.

Supply chain semantics 224 comprise Supply chain semantics provide the context in which the supply chain data is used. According to embodiments, supply chain semantics comprises an object combined with its context to make the object understood by the business planning applications. For example, an item object may comprise physical attributes, financial attributes, marketing attributes, forecasting attributes, planning attributes, and the like. These attributes provide context to business applications that use the item object. Further, when an item is new and is being introduced and needs to be treated as such, the item object semantics further provides the semantic context for forecasting, financial planning, replenishment planning, tracking, alerts, and the like.

Tenant features layer 230 of digital hub 110 comprise registration and self service module 232, billing module 234, user management module 236, partner management module 238, and data security and authorization module 240. Although tenant features layer 230 is illustrated with particular modules 232-240, embodiments contemplate any suitable number or combination modules, according to particular needs.

Registration and self service module 232 provides a registration service for users, one or more supply chain entities 150, other enterprises, and the like. After registration, the users, one or more supply chain entities 150, and/or enterprises become discoverable. According to embodiments, discoverability comprises the property of an object to be discovered for use and interaction by others. A user, when discoverable, may be visible to other users for partnership and collaboration. Similarly, a resource made discoverable mat be available for bidding and auctioning and use by others. Locations may be made discoverable to be used as a sublet for storage. Factories may be made discoverable to be sub-contracted. Items may be made discoverable to be sold.

Billing module 234 provides mechanisms to handle billing and payment according to any embodied contracts. User management module 236 provides for the ability to flexibly manage users, including user roles and evolution. Partner management module 238 provides a mechanism to enable partners to access portions of digital hub 110 according to the nature of their collaboration with one or more supply chain entities 150. Data security and authorization module 240 ensures proper authentication and authorization of access to information and its association with business processes and provides for 'sharing' or 'hiding' of information at various levels of aggregations and horizons.

Platform features layer 250 of digital hub 110 comprises collaboration widgets 252, algorithms and data science library 254, extension tools 256, life cycle management widget 258, state machine 260, task management tools 262, natural language processing tools 264, and business process workflow tools 266. Although platform features layer 250 is illustrated as comprising collaboration widgets 252, algorithms and data science library 254, extension tools 256, life cycle management widget 258, state machine 260, task management tools 262, natural language processing tools 264, and business process workflow tools 266, embodiments contemplate any suitable number or combination widgets, tools, frameworks, or state machines, according to particular needs.

Collaboration widgets 252 comprise widgets that enable intra- and inter-enterprise collaboration. Collaboration widgets 252 may include social collaboration widgets (such as, for example, instant messaging, emails, shared space, guest views, and the like), document collaboration widgets (sharing published documents, spreadsheets, and the like), and planning object collaboration widgets (providing collaboration over order plans, purchase orders, pick lists, forecasts, promotions, and the like, and may include approval workflows, comments, and reason codes).

Algorithms and data science library framework 254 may enable mathematical and machine learning algorithms to be available for implementation into or use by applications and tools, provide a learning framework, and enable model versioning, validation, scoring, and correction.

According to embodiments, digital hub 110 employs machine learning to forecast scenarios for the one or more supply chain entities 150. Although this may be used for exception management, as explained herein, forecasting scenarios may be used to service opportunities predicted by digital hub 110. This may include, for example, running a promotion, increasing product inventory or particular items, or the like in response to a short-term opportunity sell more of a particular product. Instead of simply forecasting a future scenario based on historical data, digital hub 110 analyzes external data sources 160 to identify opportunities that may not be accounted for in historical data. For example, a presidential inauguration happens infrequently and will likely not be easily predicted in historical sales or historical data. Furthermore, the election of a particular candidate may alter the type of products or the region where products will increase or decrease in sales in response to the inauguration. According to embodiments, digital hub 110 employs machine learning to predict what the impact of the event will be and what actions will maximize the opportunity that is presented.

Extension tools 256 may provide tools to extend the solution in a controlled context. Lifecycle management widget 258 may include seamless continuous upgrades, versioned interfaces, and standard cloud software practices. State machine 260 may comprise a well-defined state machine which may be associated with various one or more supply chain entities in diverse business processes. Task management tools 262 may comprise alerts and a framework to enable alerts and associate tasks based on states. Natural language processing tools 264 provides tools to receive and interpret questions in natural language, and for digital hub 110 to understand data and free text.

According to embodiments, digital hub 110 provides for a natural language search feature that provides recommendations for remedial actions or provide information about the supply chain. According to embodiments, natural language processing tools 264 may provide responses to queries regarding trading partners, industry trends, cross-industry trends, and within an enterprise, such as, for example, "What is the best color dress I should sell this month in the Southwest region of the United States?"; "What was the cause of delay?"; "What is the average cycle time for my industry?"; "Does the semiconductor foundry capacity support the expected demand for mobile devices in the later half of the year?"; "What is the impact of a warm winter on snow boot sales?"; and the like.

Business process workflow 266 provides for defining business process workflows. According to embodiments, virtual supply chain network 222 captures business aspects of supply chain network, which are related in action oriented workflows. Business process workflow 266 provides tools to create and represent these workflows. Content and connections layer 270 comprises native data source management connection 272, partner data source management connection 274, streaming data source management connection 276, and supply chain data lake 278.

Native data source management connection 272 manages access to data from native data sources. Partner data source management connection 274 manages access to data from partner data sources. Streaming data source management 276 manages streaming data content. Supply chain data lake 278 comprises a secure reservoir for supply chain data, which is made available for qualified extremely fast access and summarization. Although content and connections layer 270 illustrates three data source management connections 272-276 and a single supply chain data lake 278, embodiments contemplate any suitable number and combination of data source management connections 272-276 and/or supply chain data lakes 278.

Returning to virtual supply chain network 222 of digital hub 110, embodiments of virtual supply chain network 222 represent business plans, goals, and objectives at all levels of the supply chain network. For example, an item's operational goal may be to get processed, transported and ultimately sold as quickly as possible. A category goal may be to make x % increase in revenue at y % margin. Similarly, a store's objective may be to achieve z dollars of sale for the week, month, or other period. In addition, a vendor-retailer relationship or a vendor-manufacturer relationship may likewise have a common goal for the relationship, while having 'hidden' goals for their own entities or companies. According to embodiments, these cooperative situations may be represented in terms of real world 'shared' goals and secure 'hidden' goals. Digital hub 110 provides the ability to generate shared and hidden goals, and plan accordingly to achieve these goals. While many of these goals are competing, the cooperation between the various business abstractions of the supply chain network moves the supply chain network to deliver to the corporate goals of various enterprises.

As an example only and not by way of limitation, digital hub 110 enables the Uberization of supply chain capabilities, including, for example, warehouse, factory, transportation, store, or other enterprise capabilities. In another example, a transportation portal offers transportation capacity for hire and the digital hub 110 provides information on how this will affect an enterprise business and/or operational plans. According to other embodiment, the digital hub 110 provides for fluid relationships of participating partners, such that the partners determine when they want to be visible to others and in what context. Relationships are formed to deliver to common objectives, and get dissolved once the objective is achieved. This extends the range of supported relationships to spot relationships on one end, and strategic ones on the other.

In addition, or as an alternative, various capabilities may be offered for hire, hired with qualifications, and then dissolved once a common objective between one or more supply chain entities 150 or enterprises is achieved. These and other strategic collaborations will be enabled by the digital hub 110 to reduce or eliminate inefficiencies of supply chain networks by, among other things, quickly agreeing to restructure the supply chain network, simulating the changes caused by the restructuring, deploying the changes in a controlled manner, and rolling out the changes worldwide. Digital hub 110 will enable alignment of each action with corporate goals and provide visibility into misalignments. In addition, or as an alternative, digital hub 110 generates industry-wide performance standards and best practices, even as business conditions change.

By way of further explanation, an example is now given. Although digital hub 110 may quickly restructure the supply chain network, such as, for example, shipping direct to store during an in-season, but shipping via DC otherwise, digital hub 110 may also restructure business relationships between the one or more supply chain entities. For example, a supply chain entity 150 may enter into a partnership with a warehouse for the next four weeks and then terminate the relationship once the need is met. By way of a further example, a supply chain entity 150 may use digital hub 110 to place a spot order for 1000 items, and digital hub 110 may generate an option to extend the contract to a multi-year contract if it is satisfied with the performance of the initial spot order. By way of yet another example, digital hub 110 provides a supply chain entity 150 with a collaboration tool allowing collaboration between itself and a vendor to forecast and supply a particular group of items of a total set in a particular region and a particular time period, while allowing a different collaboration ability with different items in the same set. For example, the supply chain entity 150 may collaborate with a vendor on forecasting and supply five out of one hundred items in a northeast region on a weekly basis, while collaborating with the same vendor at a monthly level for the rest of the items. Additionally, digital hub 110 provides for altering the relationship at any time, by extending the collaboration to additional items, withdrawing visibility to the collaboration, or making the time period more coarse or fine depending on the particular business needs.

As discussed above, embodiments of the digital hub 110 provide all aspects of planning with insight into an entire supply chain network, including contextualizing the vast amount of data that is being generated by one or more supply chain entities 150 and processed and digested by digital hub 110. When planning is done in silos, then decisions made in silos will have increasingly divergent assumptions, which may result in, for example, stock-outs and overstocks in the wrong locations at the wrong time. To further illustrate, an example is now given. In the following example, assume a store reacts to a traffic delay of a delivery truck by running a promotion on a substitute item. In siloed planning environments, some planning applications may not have visibility to the promotion of the substitute item, which would lead to incorrect and misaligned plans. However, embodiments of digital hub 110 provide for a substitute promotion and its results on the entire supply chain network is immediately visible to other supply chain management and planning functions, including, for example, warehouse management, transportation management, demand planning, replenishment planning, and analytics functions of the digital hub 110. This example demonstrates that eliminating siloes helps align goals and plans for one or more supply chain entities 150, across enterprises, and across an entire supply chain network.

In addition, by eliminating silos around information and decisions, digital hub 110 allows one or more planners to make better predictions of the consequences of corrective actions. For example, assume that an outage has occurred in one of the production lines in a factory. In current supply chain management, when a production line outage occurs, the decision is usually made quickly and with access to only limited information available to them. Such a decision may seek to optimize a single factor, such as revenue or cost savings. Because digital hub 110 has insight into the whole supply chain and to data outside the supply chain, digital hub 110 may generate better, more informed decisions that may be presented as various options to a user to resolve the production line outage. For example, currently a supply chain planner has limited, if any, tools to predict the carbon dioxide impact of different resolutions to the production line outage. However, digital hub 110 has access to the data and context to understand that the impact of possible resolutions on carbon dioxide output, which may be necessary for an enterprise to comply with environmental regulations, for example. By providing additional considerations for resolutions, digital hub 110 helps eliminate rash decisions.

According to embodiments, a forecast planner associated with one or more supply chain entities 150 generates a statistical product forecast for an upcoming season based on historical sales during that period and seasonality effects on sales that indicates when products will be made and shipped during the upcoming season. These forecasts may be used as an input to digital hub 110, which may analyze the forecast (or one or more plans based on the forecast) and align it more closely with supply chain realities. For example, digital hub 110 may compare the forecast or plan with trends or patterns identified in the aggregated enterprise and external data to alert one or more supply chain entities 150 about any shortcomings of the plan.

To further illustrate, two non-limiting examples are now given. In a first example, a consumer packaged goods (CPG) company is planning to promote a product. Based on all the information it becomes apparent that this promotion will more than double sales of the product. This means that to make the promotion successful, the CPG company needs to obtain additional warehouse and transportation capacity to satisfy the doubling of sales of the product. According to embodiments, digital hub 110 makes visible, available transportation and warehouse capacity, from participating partners who have this capacity to offer (this is one non-limiting 'Uberization' example of a supply chain network). The CPG company can now not only evaluate the additional storage and transportation capacity, but also weigh it against the gains made from the promotion. Essentially, the decision is, is it worth obtaining the capacity or does it make sense to lose the sales and is an important distinction. The digital hub 110 is helping not only establish spot relationships, but also providing the entity or enterprise insight on if it's a viable decision. According to embodiments, digital hub 110 provides this link to the supply chain objectives.

In a second example, a large multi-national beverage company sells a particular soft drink in various sizes and packaging. By aggregating information across various supply chain entities 150, digital hub 110 may be able to identify a change in sales or consumption early and identify the root cause. The root cause could be recognized by an inflection point of a trend change in sales, a misalignment with a plan, or the like. The root cause may be traced to some particular event, outside the supply chain network, such as social news, events, or weather. For example, individual retailers of the soft drink may not be able to identify a sudden uptick in sales of a particular size or packing. However, digital hub 110 may identify from analyzing the aggregate data from one or more supply chain entities 150 the root cause of an increase in sales volume, which may be caused, for example, by a popular celebrity posting a photo of her with the soft drink on her INSTAGRAM social media account.

Not only does digital hub 110 identify the root cause of the uptick, but embodiments of digital hub 110 also provides the one or more supply chain entities 150 with prescriptive options to benefit from the uptick in sales. For example, digital hub 110 may provide retailers with prescriptive option of putting more of the product into their stores, manufacturers may be provided the option to increase production, shippers may be provided the option to hire increased transportation capacity.

As discussed above, digital hub 110 provides one or more users with industry-wide and cross-industry-wide data and analysis. Although the previous examples illustrate the analysis by digital hub 110 on a single customer basis, embodiments of digital hub 110 analyze all sources of available data to provide insights across a single industry or across many industries. For example, digital hub 110 analyzes the entire value chain, which, for a soft drink manufacturer, may comprise the manufacturer, the bottler, the third-party logistics, the retailers, and the like. Although digital hub 110 permits sharing of information from the analysis of the entire value chain, embodiments contemplate aggregating the shared information to anonymize it before sharing. For the soft drink example above, this may comprise sharing insights that high sugar content drinks are showing an increased level of sales within a particular region or sales of a particular product or category of products are trending upwards.

A distinct advantage of the approach to sharing information with digital hub 110 is that it does not require each supply chain entity 150 to harmonize data or directly share access to data. This reduces the financial burden to each entity and lowers the barrier of entry to take advantage data sharing and aggregation.

Turning to a different example, digital hub 110 may provide mapping of items from one supply chain entity 150 to another. One or more supply chain entities 150 often assign different identifiers to products. Sometimes, one or more supply chain entities 150 try to inhibit competitive pricing by assigning a different product identifier, such as a SKU, to retail product so that customers cannot easily use an Internet search engine to directly compare prices among different retailers. Embodiments of digital hub 110 provides a mapping between a group of products identified by a first product identifier and a group of products identified by a second product identifier to determine the relationship, if any, between the two groups of products.

By way of further explanation, a particular example is now given. In the following example, a big box electronics retailer sells electronic devices including game systems. To dissuade customers from easily comparing prices between game systems, the retailer assigns different SKUs to the products than were assigned to the products when the products were received. According to embodiments, digital hub 110 determines that what is represented by, for example, 1234, at the retailer, is the same item that is represented by, for example, ABCD, at a product manufacturer. Digital hub 110 may use deterministic logic to associate a shipment of a particular number of products from a manufacturer to a distributor with the sales from a company of the same number of a product that uses the same distributor. For example, if digital hub 110 receives data that indicates that three hundred units are shipped from a manufacturer on a given day to a regional warehouse, and then three hundred are being sold from a big box retailer over a given period of time, digital hub 110 may employ deterministic routines to correlate the two events to increasingly build confidence that the two products are the same.

In addition, digital hub 110 may use deterministic routines to align hierarchies of different supply chain entities 150. Digital hub 110 may use character maps, word maps, and/or sales trends to align hierarchies of different supply chain entities 150. For example, digital hub 110 may determine that based on keyword matching, two products may belong to the same category with a confidence of 60%. However, using sales patterns along with keyword matching, digital hub 110 may gain a higher confidence that the two products are in the same category or are actually the identical product. Using this type of hierarchy alignment, digital hub 110 may use the hierarchy of one supply chain entity 150 with known products and known relationships to determine the identity and relationship of products of another supply chain entity 150 where the products and relationships are not known or imprecisely known.

Although digital hub 110 is described as using data in any format and aligning the data, embodiments contemplate digital hub 110 defining common data standards to permit easier sharing and insight retrieval from data. For example, according to embodiments, digital hub 110 defines common data standards based on big data. Digital hub 110 may define a new set of data standards through digital hub, where the format of the data makes it easy to onboard onto the platform. The data standards may define a format to allow machine learning of digital hub 110 to easily sort, analyze, and extract insights from the data.

In addition, or as an alternative, although digital hub 110 may determine relationships between products for one supply chain entity 150 are identical to products from another supply chain entity 150, digital hub 110 may also create relationships based on probabilities. For relational databases, the relationships between different entries (such as, for example, a SKU, item, purchase order, ASN, shipment request, or the like) are linear or direct. According to embodiments, digital hub 110 permits dynamic relationships, including, for example, circular relationships or probabilistic relationships between different entries. For example, digital hub 110 may understand that a SKU relates to an item and a location and that a purchase order must include a SKU. Therefore, digital hub 110 may more quickly identify within a purchase order the items or locations specified. For relational databases, this requires traversing back up the relationships, but with digital hub 110 the relationships are learned by the system and the connections are more loosely made and may be learned and created ad hoc. These connections are adapted to access patterns and are constantly updated by adding the relationships into, for example, a graph database.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system comprising:
a digital hub comprising one or more containers and a cloud database, wherein the one or more containers each comprise an application engine, one or more processors, and a memory; and
one or more supply chain entities of a supply chain network and one or more external data sources that are separate from and communicatively coupled with the digital hub comprising the one or more containers and the cloud database;
wherein the digital hub is configured to:
encode, as a virtual supply chain network, a structure, one or more objectives, and one or more states of the supply chain network;
contextualize data received from the one or more supply chain entities and received from the one or more external data sources with the virtual supply chain network;
employ machine learning to extract insights from the contextualized data;
monitor the one or more external data sources for an event that impacts the one or more objectives of the supply chain network;
in response to identifying the event that impacts at least one of the one or more objectives, automatically adjust one or more robotic warehouse systems; and
offer industry-wide and cross-industry-wide supply chain metrics available on a subscription basis, wherein the industry-wide and cross-industry-wide supply chain metrics comprise data that has been aggregated to anonymize the data.

2. The system of claim 1, wherein the digital hub is further configured
- identify a first objective of the one or more objectives from a first supply chain entity of the one or more supply chain entities;
- identify a second objective of the one or more objectives from a second supply chain entity of the one or more supply chain entities;
- in response to matching the first objective with the second objective, provide an offer to the first supply chain entity to hire one or more capabilities of the second supply chain entity; and
- in response to completion of the matched objective, dissolve the offer to hire the one or more capabilities of the second supply chain entity.

3. The system of claim 1, wherein the digital hub is further configured to generate responses based on the contextualized data in response to a natural language query.

4. The system of claim 3, wherein the external data sources comprise one or more of social media, geopolitical events, weather, market data, and a data hub.

5. The system of claim 4, wherein the structure of the supply chain network comprises a physical, logical, and business structure of the supply chain network.

6. The system of claim 1, wherein the one or more robotic warehouse system comprises one or more of robotic inventory systems, automated guided vehicles, mobile racking units, automated robotic production machinery, or robotic devices.

7. A method comprising:
- encoding, as a virtual supply chain network, a structure, one or more objectives, and one or more states of a supply chain network using a digital hub comprising one or more containers and a cloud database, wherein the one or more containers each comprise an application engine, one or more processors, and a memory;
- contextualizing data received from one or more supply chain entities of the supply chain network and received from one or more external data sources that are separate from and communicatively coupled with the digital hub, with the virtual supply chain network;
- employing machine learning to extract insights from the contextualized data;
- monitoring the one or more external data sources for an event that impacts the one or more objectives of the supply chain network;
- in response to identifying the event that impacts at least one of the one or more objectives, automatically adjusting one or more robotic warehouse systems; and
- offering industry-wide and cross-industry-wide supply chain metrics available on a subscription basis, wherein the industry-wide and cross-industry-wide supply chain metrics comprise data that has been aggregated to anonymize the data.

8. The method of claim 7, further comprising:
- identifying a first objective of the one or more objectives from a first supply chain entity of the one or more supply chain entities;
- identifying a second objective of the one or more objectives from a second supply chain entity of the one or more supply chain entities;
- in response to matching the first objective with the second objective, providing an offer to the first supply chain entity to hire one or more capabilities of the second supply chain entity; and
- in response to completion of the matched objective, dissolving the offer to hire the one or more capabilities of the second supply chain entity.

9. The method of claim 7, further comprising:
generating responses based on the contextualized data in response to a natural language query.

10. The method of claim 9, wherein the external data sources comprise one or more of social media, geopolitical events, weather, market data, and a data hub.

11. The method of claim 10, wherein the structure of the supply chain network comprises a physical, logical, and business structure of the supply chain network.

12. The method of claim 7, wherein the one or more robotic warehouse system comprises one or more of robotic inventory systems, automated guided vehicles, mobile racking units, automated robotic production machinery, or robotic devices.

13. A non-transitory computer-readable medium embodied with software, the software when executed configured to:
- encode, as a virtual supply chain network, a structure, one or more objectives, and one or more states of a supply chain network using a digital hub comprising one or more containers and a cloud database, wherein the one or more containers each comprise an application engine, one or more processors, and a memory;
- contextualize data received from one or more supply chain entities of the supply chain network and received from one or more external data sources that are separate from and communicatively coupled with the digital hub, with the virtual supply chain network;
- employ machine learning to extract insights from the contextualized data;
- monitor the one or more external data sources for an event that impacts the one or more objectives of the supply chain network;
- in response to identifying the event that impacts at least one of the one or more objectives, automatically adjust one or more robotic warehouse systems; and
- offer industry-wide and cross-industry-wide supply chain metrics available on a subscription basis, wherein the industry-wide and cross-industry-wide supply chain metrics comprise data that has been aggregated to anonymize the data.

14. The non-transitory computer-readable medium of claim 13, wherein the software is further configured to:
- identify a first objective of the one or more objectives from a first supply chain entity of the one or more supply chain entities;
- identify a second objective of the one or more objectives from a second supply chain entity of the one or more supply chain entities;
- in response to matching the first objective with the second objective, provide an offer to the first supply chain entity to hire one or more capabilities of the second supply chain entity; and
- in response to completion of the matched objective, dissolve the offer to hire the one or more capabilities of the second supply chain entity.

15. The non-transitory computer-readable medium of claim 13, wherein the software is further configured to:
generate responses based on the contextualized data in response to a natural language query.

16. The non-transitory computer-readable medium of claim 15, wherein the external data sources comprise one or more of social media, geopolitical events, weather, market data, and a data hub.

17. The non-transitory computer-readable medium of claim 16, wherein the structure of the supply chain network comprises a physical, logical, and business structure of the supply chain network.

\* \* \* \* \*